United States Patent [19]
Billingsley et al.

[11] Patent Number: 5,812,317
[45] Date of Patent: Sep. 22, 1998

[54] EXPOSED LENS RETROREFLECTIVE ARTICLE HAVING A POLYMERIC INTERMEDIATE LAYER DISPOSED BETWEEN MICROSPHERIC AND REFLECTIVE LAYERS

[75] Inventors: Britton G. Billingsley, St. Paul; Robert J. Fleming, Woodbury, both of Minn.

[73] Assignee: Minnesota Mining and Manufacturing Company, St. Paul, Minn.

[21] Appl. No.: 548,578

[22] Filed: Oct. 26, 1995

[51] Int. Cl.⁶ .................................................. G02B 5/128
[52] U.S. Cl. .......................... 359/536; 359/519; 359/540; 428/325
[58] Field of Search .......................... 359/534, 536–543, 359/519; 428/245, 246, 265, 266, 343, 325; 156/230, 232–234, 240–241

[56] References Cited

U.S. PATENT DOCUMENTS

| | | | |
|---|---|---|---|
| 2,326,634 | 8/1943 | Gebhard et al. | |
| 2,379,702 | 7/1945 | Gebhard. | |
| 2,440,584 | 4/1948 | Heltzer et al. | |
| 3,190,178 | 6/1965 | McKenzie. | |
| 3,573,954 | 4/1971 | Yamamoto | 359/536 |
| 3,700,305 | 10/1972 | Bingham | 359/540 |
| 4,367,920 | 1/1983 | Tung et al. | 359/540 |
| 4,605,461 | 8/1986 | Ogi | 156/233 |
| 5,200,262 | 4/1993 | Li | 428/266 |
| 5,283,101 | 2/1994 | Li | 428/141 |
| 5,344,705 | 9/1994 | Olsen | 428/323 |
| 5,503,906 | 4/1996 | Olsen | 428/195 |
| 5,514,441 | 5/1996 | Pohto et al. | 359/538 |
| 5,620,613 | 4/1997 | Olsen | 216/24 |

FOREIGN PATENT DOCUMENTS

| | | | |
|---|---|---|---|
| 54-83392 | 7/1979 | Japan | G02B 5/128 |
| 61-9601 | 3/1986 | Japan | G02B 5/128 |
| WO 96/16343 | 5/1996 | WIPO | G02B 5/128 |

OTHER PUBLICATIONS

3M Technical Report Summary dated Apr. 25, 1995 for "Analysis of Seven Reflective Fabrics from Unitika".
Polyurethane Handbook, pp. 12–16 (1994) (no month).
E.P. Plueddemann, Silane Coupling Agents, pp. 116–120 (2d. ed. 1991) (no month).
Miles "Product Index—Raw Materials For High–Performance Coatings" (1992) (no month).
Miles "Product Information—Coatings—Desmodur CB–75N" (Dec. 1994).
Union Carbide Product Information "Organofunctional Silanes Products and Applications" (1991, 1992, and 1993) (no month).
Radcure Product Profile (Apr. 1992).
Texaco Chemical Company "The Jeffamine Polyoxyalkyleneamines" )1987, 1989, 1991, 1992) (no month).
Arco Chemical Product Literature for Arcol® e–2306 Performance Polyether polycol C.A.S. No. 25791–96–2 (1994) (no month).
3M Analytical Report for Unitika reflective products MR 3501, MR 891, MR 801, and MR 801S (Jan. 12, 1995).
3M Analytical Report for Unitika reflective product MR–801 (Sep. 19, 1990).
3M Laboratories (Europe) Analytical Report for analysis of Competitor's Retroreflective Fabric Transfer Film (Dec. 21, 1992).
3M Analytical Report for Unitika MR 801 (Jan. 4, 1991).
3M UK Analytical Report for Unitika Reflective Fabric product (Nov. 30, 1990).

Primary Examiner—James Phan
Attorney, Agent, or Firm—Karl G. Hanson

[57] ABSTRACT

An exposed lens retroreflective article 10 has in sequence a layer of microspheres 12, a polymeric intermediate layer 18, a metal reflective layer 16, and a polymeric binder layer 14. Microspheres 12 are partially embedded in the binder layer 14, and the intermediate layer 18 and the metal reflective layer 16 are disposed between the microspheres 12 and the binder layer 14 such that the intermediate layer 18 is in contact with microspheres 12. Retroreflective articles of this construction provide improved laundering durability.

25 Claims, 1 Drawing Sheet

5,812,317

EXPOSED LENS RETROREFLECTIVE ARTICLE HAVING A POLYMERIC INTERMEDIATE LAYER DISPOSED BETWEEN MICROSPHERIC AND REFLECTIVE LAYERS

TECHNICAL FIELD

The present invention pertains to an exposed lens retroreflective article that has a polymeric intermediate layer disposed between a microsphere layer and a reflective layer.

BACKGROUND

Retroreflective articles return incident light back towards the light source. This unique ability has promoted widespread use of retroreflective articles on clothing.

Persons who work or exercise near motor vehicle traffic need to be conspicuously visible so that they do not get struck by passing motor vehicles. Retroreflective articles highlight a person's presence to motorists at nighttime by retroreflecting light from motor vehicle headlamps. Light from the headlamps strikes the retroreflective article on the wearer's clothing and is returned toward the motor vehicle. The bright image displayed by the retroreflective article gives motorists more time to react.

Because retroreflective articles are frequently used on clothing, they must be able to withstand laundering conditions—otherwise, the articles cannot continue to serve their safety function after repeated washings. Investigators who work in the retroreflective art are aware of this problem, and therefore they pursue an ongoing goal of developing launderably-durable retroreflective articles so that persons who wear retroreflective clothing remain conspicuously visible after their clothing has been worn and laundered many times.

Investigators also recognize that the need to develop such articles is particularly pronounced for clothing that regularly is worn in harsh environments. Examples of such clothing includes firemen's jackets and construction workers' safety vests. These garments tend to get very dirty, very often, and therefore they are frequently cleaned under industrial laundering conditions. Industrial laundering conditions involve wash temperatures as high as 40° to 90° C. (105° to 190° F.) and pH values of 10 to 12.5.

Some launderably-durable retroreflective articles that have been developed for use on clothing comprise an exposed layer of transparent microspheres, a polymeric binder layer, and a specularly reflective layer. The transparent microspheres are partially embedded in the polymeric binder layer, and the specularly reflective layer is disposed on the microspheres' embedded portions. Because the microspheres are exposed—that is, they are not covered by a light-transmissible polymeric layer—the articles are commonly referred to as "exposed lens retroreflective articles". Light that strikes the front surface of these retroreflective articles enters the transparent microspheres to have its direction altered to strike the underlying specularly reflective layer. After striking the reflective layer, the light returns to the microspheres where its direction is again altered but this time back in the direction of the light source.

In a successful attempt at developing an exposed lens retroreflective article that is durable under industrial laundering conditions, Wu Shyong Li in U.S. Pat. No. 5,200,262 partially embedded a monolayer of metal-coated microspheres in a binder layer that contained a flexible polymer and one or more isocyanate-functional silane coupling agents. The flexible polymers included isocyanate curable polyesters and one or two component polyurethanes.

In another successful attempt, Li used a binder layer that was formed from an electron-beam curable polymer and typically one or more crosslinkers and silane coupling agents (see U.S. Pat. No. 5,283,101). The electron-beam curable polymers included chlorosulfonated polyethylenes, ethylene copolymers comprising at least about 70 weight percent of polyethylene such as ethylene/vinyl acetate, ethylene/acrylate and ethylene/acrylic acid, and poly (ethylene-co-propylene-co-diene) polymers. The microspheres were embedded in the cured binder layer, and a specular reflective metal layer was disposed on the microspheres' embedded portions.

In another approach, Michael Crandall et al. made an exposed lens retroreflective article launderably-durable by placing a compound that contains an aromatic bidentate moiety in chemical association with the reflective metal layer. In one embodiment, the compound is disposed in a polymeric binder layer that preferably includes a crosslinked or virtually crosslinked elastomer. Crosslinked polymers include polyolefins, polyesters, polyurethanes, polyepoxides, and natural or synthetic rubbers. This product is disclosed in U.S. patent application Ser. No. 08/216,404 now U.S. Pat. No. 5,474,827.

Although exposed lens retroreflective articles have been produced that exhibit excellent laundering durability, retroreflective articles also have been developed where the microspheres are not exposed. These articles are commonly referred to as "enclosed lens" or "encapsulated lens" retroreflective sheetings. In these articles, the microspheres are covered by a light-transmissible polymeric top layer—see for example, U.S. Pat. Nos. 5,378,520, 5,262,225, 5,256, 721, 5,069,964, 4,988,555, and 4,725,494. The polymeric top layer can be shiny and glossy to enhance the article's aesthetic appearance under daytime lighting conditions. The polymeric top layer also allows the article to be wiped clean very easily, and the articles generally exhibit good retroreflectivity when wet. Enclosed lens retroreflective articles, however, tend to be more rigid and more complicated in construction than exposed lens articles. The polymeric top layer can impose upon the article's ability to be flexed, and the articles must also possess an intermediate layer that is disposed between the microspheres and the reflective layer. The intermediate layer is employed to compensate for optical affects caused by the top layer (exposed lens article by definition do not enclose the microspheres in a polymeric top layer and therefore do not need to possess an intermediate layer).

Enclosed lens articles also generally suffer from the drawback of not being very useful at high temperatures because the polymeric top layer can melt. Enclosed lens articles therefore do not rate as high as exposed lens articles when considering candidates for use on firemen's jackets.

SUMMARY OF THE INVENTION

The present invention provides a new exposed lens retroreflective article that demonstrates improved laundering durability. The new retroreflective article comprises an exposed layer of light-transmissible microspheres, a polymeric binder layer, a metal reflective layer, and a light-transmissible polymeric intermediate layer. The microsphere layer is partially embedded in the binder layer, the metal reflective layer is disposed between the microsphere and the binder layer, and the intermediate layer is disposed between the microsphere layer and the metal reflective layer. The intermediate layer has a thickness of about 5 nanometers to about 1.5 times the average diameter of the microspheres.

In another aspect, the present invention provides a new transfer for supplying a retroreflective article to a garment assembler. In a still further aspect, the invention provides an article of clothing that has the inventive retroreflective article disposed on its outer surface.

The present invention differs from known exposed lens retroreflective articles by possessing an intermediate layer that has an average thickness of about 5 nanometers to about 1.5 times the average diameter of the microspheres. The inventor discovered that by placing such an intermediate layer between the microspheres and the reflective layer that enhanced laundering durability is provided without having substantial adverse affects on the retroreflective articles' optical performance. Articles of this invention therefore can be very suitable for use on firemen's jackets and other garments such as construction workers' safety vests.

BRIEF DESCRIPTION OF THE DRAWINGS

In the drawings:

FIGS. 1–3 are idealized and are not drawn to scale.

DETAILED DESCRIPTION OF THE PREFERRED EMBODIMENTS

Figure 1:
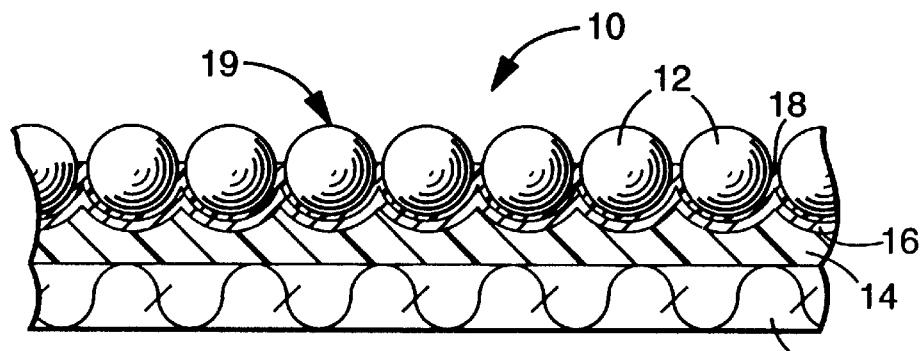
FIG. 1 is a cross-sectional view of a exposed lens retroreflective article 10 in accordance with the present invention.

FIG. 1 illustrates a exposed lens retroreflective article 10 that includes microspheres 12 partially embedded in a binder layer 14. Disposed between the microspheres 12 and the binder layer 14 is a reflective metal layer 16. The microspheres 12 and the reflective metal layer 16 return a substantial quantity of incident light towards the light source. Light that strikes the retroreflective article's front surface 19 passes through microspheres 12 and is reflected by layer 16 to again reenter the microspheres 12, where the light's direction is then altered to return towards the light source. A light-transmissible intermediate layer 18 is disposed between the microspheres 12 and the metal reflective layer 16 such that it does not deleteriously affect the article's optics. The intermediate layer 18 and the metal reflective layer 16 each generally are very thin relative to binder layer 14. The retroreflective article 10 typically includes a substrate 20 such a fabric to give the article better structural integrity.

The microspheres used in the invention preferably are substantially spherical in shape to provide uniform and efficient retroreflection. The microspheres preferably also are highly transparent to minimize light absorption so that a large percentage of incident light is retroreflected. The microspheres often are substantially colorless but may be tinted or colored in some other fashion. The microspheres may be made from glass, a non-vitreous ceramic composition, or a synthetic resin. In general, glass and ceramic microspheres are preferred because they tend to be harder and more durable than microspheres made from synthetic resins. Examples of microspheres that may be useful in this invention are disclosed in the following U.S. Pat. Nos.: 1,175,224, 2,461,011, 2,726,161, 2,842,446, 2,853,393, 2,870,030, 2,939,797, 2,965,921, 2,992,122, 3,468,681, 3,946,130, 4,192,576, 4,367,919, 4,564,556, 4,758,469, 4,772,511, and 4,931,414. The disclosures of these patents are incorporated here by reference.

The microspheres typically have an average diameter of about 30 to 200 micrometers, and preferably of about 50 to 150 micrometers. Microspheres smaller than this range tend to provide lower levels of retroreflection, and microspheres larger than this range may impart an undesirably rough texture to the retroreflective article or may undesirably reduce its flexibility. Microspheres used in the present invention typically have a refractive index of about 1.2 to 3.0, preferably about 1.6 to 2.2, and more preferably about 1.7 to 2.0.

The light-transmissible intermediate layer comprises a polymeric material that may be the same as or different from the polymeric material of the binder layer (discussed below). This intermediate layer in a preferred embodiment comprises a polymer that is linked to a silane coupling agent. To provide good laundering durability, the polymer preferably is a crosslinked polymer. Examples of polymers that may be suitable include those that contain units of urethane, ester, ether, urea, epoxy, carbonate, acrylate, acrylic, olefin, vinyl chloride, amide, alkyd, or combinations thereof The polymer that is used in the intermediate layer may have functional groups that allow the polymer to be linked to the silane coupling agent, or the reactants that form the polymer may possess such functionality. For example, in producing polyurethanes, the starting materials may possess hydrogen functionalities that are capable of reacting with an isocyanate-functional silane coupling agent; see for example, U.S. Pat. No. 5,200,262 to Li, incorporated here by reference.

Preferred polymers are crosslinked poly(urethane-ureas) and crosslinked poly(acrylates). These polymers can maintain their properties under the rigors of the industrial laundering process and when being worn as clothing.

Poly(urethane-ureas) may be formed by reacting a hydroxy-functional polyester resin with excess polyisocyanate. Alternatively, a polypropylene oxide diol may be reacted with a diisocyanate and then with a triamino-functionalized polypropylene oxide.

Crosslinked poly(acrylates) may be formed by exposing acrylate oligomers to electron beam radiation; see for example, U.S. Pat. No. 5,283,101 to Li incorporated here by reference.

Examples of commercially available polymers that may be used in the intermediate layer include: Vitel™ 3550 available from Shell Oil Company, Akron, Ohio; Ebecryl™ 230 available from UBC Radcure, Smryna, Ga.; Jeffamine™ T-5000, available from Huntsman Corporation, Houston, Tex.; and Arcol™ R-1819, available from Arco Chemical Company, Newtown Square, Pa.

The intermediate layer has an average thickness from about 5 nanometers to 1.5 times the average diameter of the microspheres. Preferably, the intermediate layer has an average thickness from about 100 nanometers to about the average diameter of the microspheres. More preferably, the intermediate layer's average thickness is about one (1) micrometer to about 0.25 times the average diameter of the microspheres. The intermediate layer thickness may be greater between the microspheres than on the microspheres. The intermediate layer preferably is continuous, but there may be some very small regions—particularly at the most embedded portion of the microspheres—where the intermediate layer is discontinuous, i.e., its thickness is zero or approaches zero. Thus, the intermediate layer is continuous or substantially continuous.

As mentioned above, a metal reflective layer is disposed beneath the embedded portions of the microspheres. The term "metal reflective layer" is used herein to mean a layer comprising elemental metal in pure or alloy form which is capable of reflecting light, preferably specularly reflecting light. The metal may be a continuous coating produced by vacuum-deposition, vapor coating chemical-deposition, or electroless plating. Typically, the metal reflective layer is about 50 to 150 nanometers thick.

A variety of metals may be used to provide a specularly reflective metal layer. These include aluminum, silver, chromium, nickel, magnesium, gold, tin, and the like, in elemental form.

Aluminum and silver are preferred metals for use in the reflective layer because they tend to provide good retroreflective brightness. In the case of aluminum, some of the metal may be in the form of the metal oxide and/or hydroxide. Although the reflective color of a silver coating can be brighter than an aluminum coating, an aluminum reflective layer normally is more preferred because it can provide better laundering durability when adhered to a glass optical element.

The binder layer like the intermediate layer may contain a polymer that is linked to a silane coupling agent. The term "binder layer" means a layer that substantially supports the layer of microspheres. The binder layer may independently comprise any of the polymers and silane coupling agents described above for the intermediate layer.

The intermediate layer and the binder layer may contain other ingredients such as colorants (for example, pigments, dyes, metal flakes), fillers, stabilizers (for example, thermal stabilizers and antioxidants such as hindered phenols and light stabilizers such as hindered amines or ultraviolet stabilizers), flame retardants, flow modifiers. (for example, surfactants such as fluorocarbons or silicones), plasticizers, and elastomers. Care should be taken when selecting such additives because some may detrimentally affect laundering durability. For example, high levels of flame retardants such as melamine pyrophosphate may have a deleterious effect on the article's retroreflective performance after laundering. Preferred binder layer colorants for articles having aluminum retroreflective layers include black dyes such as metal-azo dyes. Although the binder layer may contain opaque pigments, such should not be significantly present in the intermediate layer because they could harm retroreflectivity.

The binder layer typically is a continuous, fluid-impermeable, polymeric, sheet-like layer that has an average thickness of about 1 to 250 micrometers. Preferably, the average thickness is about 50 to 150 micrometers. Thicknesses less than 50 micrometers may be too thin to adhere to both the substrate and the optical elements, and thicknesses greater than 150 micrometers may unnecessarily stiffen the article and add to its cost.

Figure 2:
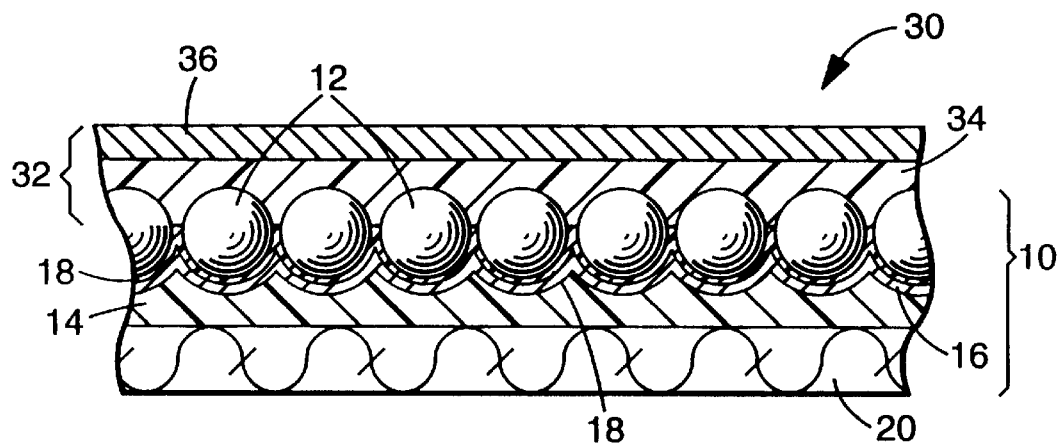
FIG. 2 illustrates a transfer article 30 that contains a retroreflective article 10 of the present invention.

A retroreflective article 10 can be made by first forming transfer article 30 shown in FIG. 2. In producing transfer 30, a multitude of microspheres 12 are partially embedded in the binder layer 14. This can be accomplished by cascading the microspheres 12 onto a carrier web 32 in a desired temporary arrangement. Microspheres 12 preferably are packed as closely as possible on the carrier 32 and may be so arranged by any convenient process, such as printing, screening, cascading, or with a hot can roll. The microspheres are partially embedded in the carrier typically to about 40 to 60 percent of the microspheres' diameter. The portions of the microspheres that are not embedded in carrier web 32 protrude from the web so that they can subsequently receive the intermediate layer, the metal reflective layer, and the binder layer in sequence.

Carrier web 32 can include a heat softenable polymer layer 34 on a paper sheet 36. Examples of useful polymer layers 34 for carrier web 32 include: polyvinyl chloride; polyolefins such as polyethylene, polypropylene, and polybutylene; and polyesters; et cetera. For a further discussion of applying microspheres to the carrier web, see U.S. Pat. Nos. 4,763,985; 5,128,804; and 5,200,262, the disclosures of which are incorporated here by reference.

Polymer layer 34 retains microspheres 12 in the desired arrangement. Depending in part on the characteristics of the carrier web 32 and microspheres 12, it may be desirable to condition carrier 32 and/or microspheres 16 by applying selected release agents or adhesion promoters to achieve desired carrier release properties.

After the microspheres are partially embedded in temporary carrier 32, the intermediate layer 18 is placed on the exposed portions of the microspheres. This can be accomplished by, for example, applying a solution of prepolymer components and silane coupling agent onto the protruding portions of the microspheres. After applying the solution, it preferably is only partially cured and the reflective metal layer 16 is applied to intermediate layer 18 on the side where the microspheres protrude from carrier 32. After applying the metal reflective layer 16, a solution of binder layer components and silane coupling agents can be applied onto the specularly reflective layer. The binder layer and the intermediate layer then preferably are fully cured together to form the retroreflective article. A fabric 20 preferably is embedded in the binder layer composition before curing. The fabric 20 is secured to the binder layer 14 on the side opposite the metal reflective layer 16. Alternatively, if a fabric is not used, an adhesive may be applied to binder layer 14 (or to the binder layer composition before curing).

Although the intermediate layer could be completely formed before the metal reflective layer and binder layer are applied, it has been discovered in this invention that it is best to cure the intermediate layer contemporaneously with the binder layer because improved laundering durability is generally obtained using such a procedure. It is believe that some form of bonding may occur between the intermediate layer and the binder layer even though the metal reflective layer is disposed therebetween. The metal reflective layer typically is thin enough to enable this inter-penetrating bonding phenomena to occur.

The inventive retroreflective articles may be applied to substrates using mechanical methods such as sewing. In some applications, however, it is desired to secure the article to the substrate by an adhesive layer (not shown). The adhesive layer can be, for example, a pressure-sensitive adhesive, a heat-activated adhesive, or an ultraviolet-radiation-activated adhesive.

The substrate bearing the retroreflective article can be located on the outer surface of an article of clothing, enabling the retroreflective article to be displayed when the clothing is worn in its normal orientation on the person. The substrate may be, for example: a woven or nonwoven fabric such as a cotton fabric; a polymeric layer including nylons, olefins, polyesters, cellulosics, urethanes, vinyls, acrylics, rubbers; leather; and the like.

Figure 3:
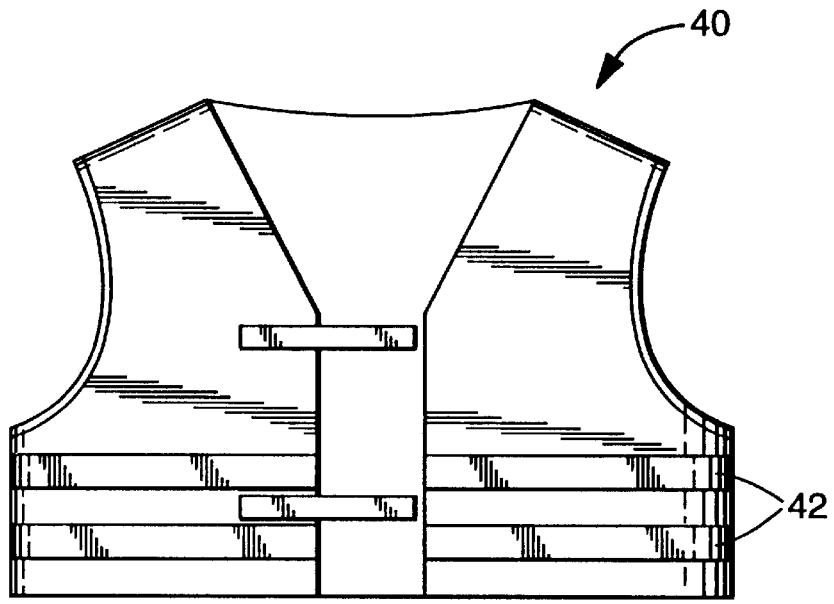
FIG. 3 illustrates an article of clothing 40 displaying a retroreflective article 10 in accordance with the present invention.

FIG. 3 illustrates a safety vest 40, displaying a retroreflective article 42 that is in the form of an elongated sheeting or strip, typically one to three inches wide. Safety vests often are worn by road construction workers to improve their visibility to oncoming motorists. These kinds of vests frequently come into contact with dirt and grime and therefore need to be able to withstand harsh cleaning conditions so that the vest can be reused a number of times.

Although a safety vest 40 has been chosen for illustration, the article of clothing of the invention may come in a variety of forms. As the term is used herein, "article of clothing" means a launderable item of wearing apparel sized and configured to be worn or carried by a person. Other examples of articles of clothing that may display retroreflective articles of the invention include shirts, sweaters, jackets (e.g. fireman's jackets), coats, pants, shoes, socks, gloves, belts, hats, suits, one-piece body garments, bags, backpacks, et cetera.

Advantages and other properties and details of this invention are further illustrated in the following Examples. It is to be expressly understood, however, that while the examples serve this purpose, the particular ingredients and amounts used and other conditions are not to be construed in a manner that would unduly limit the scope of this invention. The Examples selected for disclosure are merely illustrative of how to make preferred embodiments of the invention and how these articles generally perform.

EXAMPLES

The following procedures and tests were used in the Examples.

Industrial Laundering Procedure

Launderability was evaluated by washing and drying a piece of fabric to which the retroreflective article was applied. The combined sequence of washing and drying is referred to as a cycle. The samples were washed using a Milnor System 7 Washing Machine Model 30015M4G from Pellerin Milnor Corp. in accordance with program no. 7 for heavily soiled, colored fabrics. The fabric was a 100 percent cotton towel, and the retroreflective article was secured to the fabric by sewing. The washer was loaded with enough pieces (approximately 80) of fabric (about 45 centimeters (cm) by 75 cm) to make a 28 pound load including from one to four pieces of fabric having several (typically about 5) retroreflective articles of the invention about 5 by 15 centimeters in size secured thereto.

The cleaning agents used were 90 ml of Lever Tech Ultra a detergent (from Lever Industrial, North Charleston, S.C.) containing by weight, approximately 10 percent potassium hydroxide, 25 percent potassium citrate, and 2 percent ethoxylated lauryl alcohol (the remaining contents are not known by the inventors), and 120 ml of Lever Tech Booster (a pH builder also from Lever Industrial) containing 20 percent sodium hydroxide (the remaining contents are not known by the inventors). In Program No. 7 the following steps are carried out to complete the washing portion of a cycle:

| Operation | Time (minutes) |
| --- | --- |
| Suds | 20.5 |
| Flush | 2 |
| Flush | 7 |
| Flush | 7 |
| Flush | 2 |
| Hot Rinse | 2 |
| Split Rinse | 2 |
| Cold Rinse | 4 |
| Extract | 6 |
| Total | 52.5 (55.0*) |

*Total time in minutes, which includes approximate fill times.

In the suds step, hot water (68 liters at 80° C.) and the cleaning agents are introduced into the machine washing basket under agitation. In the flush steps, fresh hot water (68 liters at 80° C.) is added to the washing basket after the same amount of the old water containing the cleaning agents is purged.

The rinse steps essentially are the same as the flush steps except the water becomes cooler. In the first rinse, the water is approximately 80° C., in the second rinse (split rinse), the water is approximately 46° C., and in the final cold rinse, the water is approximately 18° C. The washing basket is agitated during the flush and rinse steps. In the extract step, the machine undergoes a high-speed spin cycle to remove water from the washed samples. After washing but before being tested for retroreflectivity, the samples were dried in a Maytag™ home dryer at 140° F. (60° C.) on regular setting for about 30–35 minutes to complete an Industrial Wash Procedure Cycle. After the designated number of cycles, the retroreflective brightness of the middle of each sample was determined.

Retroreflective Brightness Test

The coefficient of retroreflection, $R_A$, was measured in accordance with standardized test ASTM E 810-93b. The test results are expressed below as the percentage of initial retroreflective brightness, where $R_A$ is expressed in candelas per lux per square meter ($cd-lx^{-1}-m^{-2}$). The entrance angle used in ASTM E 810-93b was 4 degrees, and the observation angle was 0.2 degrees. Further reference to "ASTM E 810-93b" means ASTM E 810-93b where the entrance and observation angles are as specified in the previous sentence.

| Component Sources | |
| --- | --- |
| Component | Source |
| Factor ™ detergent | Fabrilife Chemicals, Inc., 455 Lake Forest Drive, Suite 300, Cincinnati, Ohio 45242 |
| Orthosil ™ pH builder | Ecolabs Inc., St. Paul,. Minnesota |
| Lever Tech Ultra ™ detergent | Lever Industrial, North Charleston, South Carolina 29418 |
| Maytag ™ home dryer | Maytag, Newton, Iowa 50208 |
| Vitel ™ 3550 polyester resin | Shell Chemical Company, 4040 Embassy Parkway, Suite 220, Akron, Ohio 44333 (Vitel ™ polymers are now available from Bostik Inc., Boston Street, Middleton, Massachusetts 01949) |
| A-1310 silane | OSI Specialties Inc., 39 Old Ridgebury Road, Danbury, Connecticut 06810 |
| Desmodur ™ W isocyanate & CB-75 polyisocyanate | Bayer Corp. (used to be called Miles), 100 Bayer Road, Pittsburgh, Pennsylvania 15205 |
| Washing machine | Pellerin Milnor Corporation, P.O. Box 400, Kenner, Louisiana 70063 |
| Primalux ™ and Excellerate ™ fabrics | Springs Industries Inc., 420 West White Street, Rock Hill, South Carolina 29730 |
| Ebecryl ™ 230 urethane acrylate | UBC Radcure, Smyrna, Georgia |
| Jeffamine ™ T-5000 a triamino-functionalized polypropylene oxide | Huntsman Corporation, Houston, Texas |
| Arcol ™ R-1819 propylene oxide diol | Arco Chemical Company, Newton Square, Pennsylvania |
| Aqua Lam ™ 1000 water-based urethane dispersion and Aqua Lam ™ CR-112 crosslinker | Morton international, 100 North Riverside Plaza, Chicago, Illinois 60606 |

Embedding Microspheres In Carrier Web

In each of the Examples, glass microspheres having an average diameter of 40 to 90 micrometers were partially and temporarily embedded in a carrier sheet. The carrier sheet included paper juxtaposed against a polyethylene layer that was about 25 to 50 micrometers thick. The microspheres were partially embedded in the polyethylene layer such that approximately 50 percent of the microspheres protruded from the carrier web. Before washing and testing for retroreflective brightness, the carrier was removed.

EXAMPLE 1

The following intermediate layer solution was mixed before it was coated onto the microspheres protruding from the carrier:

6.21 parts Vitel™ 3550 polyester resin 0.19 parts A-1310 isocyanatosilane 0.5 parts CB-75 polyisocyanate 40.35 parts methyl ethyl ketone 49.33 parts cyclohexanone This solution was coated onto the microspheres using a lab-handspread-notch-bar-coater gapped at 75 micrometers (3 mils). The sample was dried for 3 minutes at 150° F. (65.5° C.).

Within 24 hours of drying, the sample was coated with an 85 nanometer thick layer of aluminum to form the metal reflective layer. A bell jar vacuum coater was used to apply the aluminum metal.

After these steps, the following solution was prepared to form the binder layer:

50 parts Vitel™ 3550

25 parts toluene 25 parts methyl ethyl ketone 3 parts CB-75 polyisocyanate 1.5 parts of A-1310

The binder layer solution was coated onto the aluminum layer less than 24 hours after vapor coating the metal reflective layer. A 200 micrometer (8 mil) gap was used on the lab-handspread coater when applying the binder layer. The coated sample was dried for 15 seconds at 65.5° C. A 65:35 Excellerate™ polyester/cotton woven fabric from Springs Industries was laid onto the coating. This was then dried at 65.5° C. for 3 minutes and at 107° C. for 5 minutes. The sample was allowed to cure for several weeks before testing.

EXAMPLE 2

The following intermediate layer solution was mixed before being coated onto the protruding portions of the microspheres:

5.651 parts Vitel™ 3550 polyester resin 1.078 parts Ebecryl™ 230 urethane acrylate 0.186 parts A-1310 isocyanatosilane 0.186 parts A-174 methacrylate silane 0.496 parts CB-75 polyisocyanate 40.005 parts methyl ethyl ketone 49.572 parts cyclohexanone This solution was coated onto the microspheres using a lab-handspread-notch-bar-coater gapped at 75 micrometers (3 mil). The sample was dried for 3 minutes at 150° F. (65.5° C.).

Within 24 hours of drying, the sample was coated with an 85 nanometer thick layer of aluminum using a bell jar vacuum coat After applying the reflective layer, the following binder layer solution was prepared:

46.65 parts Vitel™ 3550

4.35 parts Ebecryl™ 230

25 parts toluene 25 parts methyl ethyl ketone 3 parts CB-75

1.5 parts of A-1310

1.5 parts A-174

This solution was coated onto the aluminum layer less than 24 hours after vapor coating the metal reflective layer. A 200 micrometer (8 mil) gap was used on the lab handspread coater in applying the solution. The sample was then dried for 15 seconds at 65.5° C. An 80:20 polyester/cotton woven Primalux™ fabric from Springs Industries was applied onto the coating. This was then dried at 65.5° C. for 3 minutes and 107° C. for 5 minutes. The sample was allowed to cure for several weeks and then was crosslinked with electron bead radiation.

EXAMPLE 3

The following intermediate layer solution was mixed before being coated onto the protruding portions of the microspheres:

50 parts Aqua Lam™ 1000 water based urethane dispersion 2.0 parts Aqua Lam™ CR-112 crosslinker 1.0 parts A-1310 isocyantosilane 300 parts distilled water.

The intermediate layer solution was coated onto the microspheres using a lab-handspread-notch-bar-coater gapped at 75 micrometers (3 mil). The sample was dried for 3 minutes at 150° F. (65.5° C.) and was subsequently coated within 24 hours with an 85 nanometer thick layer of aluminum. A bell jar vacuum coater was used to apply the metal reflective layer.

The following binder layer solution was prepared:

50 parts Vitel™ 3550

25 parts toluene 25 parts methyl ethyl ketone 3 parts CB-75

1.5 parts of A-1310

This solution was coated onto the aluminum layer less than 24 hours after vapor coating the metal reflective layer. A lab-handspread notch bar coater gapped at 200 micrometers (8 mil) was used to apply the binder layer solution. The sample was dried for 15 seconds at 65.5° C. An 80:20 polyester/cotton woven Primalux™ fabric from Springs Industries was applied onto the coating. The sample was then dried at 65.5° C. for 3 minutes and then at 107° C. for 5 minutes. The sample was allowed to cure for several weeks and then was crosslinked with electron bead radiation.

EXAMPLE 4A

The following intermediate layer solution was mixed before being coated onto the protruding portions of the microspheres using a #7 meyer rod:

4.01 parts Arcol™ R-1819 polypropylene oxide diol 0.13 parts A-1310 isocyanatosilane 0.77 parts Desmodur W isocyanate 0.02 parts dibutyl tin dilaurate (DBTDL)

10.3 parts cyclohexane 0.51 parts Jeffamine T-5000 triamino- functionalized polypropylene oxide The 15.7 micrometer coating was cured 3 minutes at ambient conditions, then for 5 minutes at 150° F. (65.5° C.) and for 20 minutes at 200° F. (93° C.). After curing, the coating thickness became approximately 5.5 micrometers thick on average.

The cured intermediate layer was then coated with 850 Å of aluminum (85 nanometers) using a bell jar vapor coater.

The aluminum surface was then coated with the following binder layer solution:

10.0 parts of Arcol R-1819
1.03 parts Jeffamine T-5000
0.71 parts A-1310
1.51 parts Desmodur™ W
0.05 parts DBTDL The binder layer solution was coated with a notch bar coater gapped at 200 micrometers. The coating was cured 3 minutes at ambient conditions and for 5 minutes at 150° F. (65.5° C.). A 100% polyester fabric from Milliken and Co. was applied to the coating, and then the final construction was cured at 220° F. for 20 minutes.

EXAMPLE 4B (Comparative—No Intermediate Layer)

Example 4B was made according to Example 4A except no intermediate polymeric layer was placed between the microspheres and the aluminum layer.

EXAMPLE 5A

The following solution was mixed before coating.

25 parts Vitel™ 3550
0.75 parts A-1310
2.0 parts CB-75
25 parts toluene
125 parts methyl ethyl ketone
150 parts cyclohexanone The solution was coated onto the microspheres using a 75 micrometer (3 mil) gap on a notch bar coater. The sample was dried for 3 minutes at 150° F. (65.5° C.).

The dried sample was then coated within 24 hours with 85 nanometers of aluminum in a bell jar vacuum coater.

The following solution was then prepared.

50 parts Vitel™ 3550
25 parts toluene
25 parts methyl ethyl ketone
3 parts CB-75
1.5 parts of A-1310
0.15 parts dibutyl tin dilaurate catalyst The solution was coated onto the aluminum layer within 24 hours of vapor coating the aluminum. A 200 micrometer (8 mil) gap was used on the coater. This was dried for 15 seconds at 65.5° C. A Primalux™ woven fabric was laid onto the coating, and the sample was then dried at 65.5° C. for one minute and 104° C. for 5 minutes. The sample was allowed to cure for several weeks before testing. The carrier that was used to hold the microspheres was removed to expose the beaded surface.

EXAMPLE 5B (Comparative—No Intermediate Layer)

This Example was prepared according to Example 5A except no interlayer was used. Instead the aluminum was deposited directly onto the glass microspheres. Also, the binder layer was dried for 87° C. for one minute and 99° C. for 6 minutes.

Examples 5A and 5B were tested as described above except the detergents and temperatures varied and a Milnor™ EP-10 washing machine was used. Program 7 was used on the washing machine, and 30 grams of Factor™ detergent (containing tetrasodium pyrophosphate, nonylphenoxypoly(ethyleneoxy)ethanol, sodium carbonate, and silica), 60 grams of Orthosil™ (pH builder containing NaOH) were used in the laundering procedure. The wash temperature was 140° F. (60° C.) in the suds and flush steps.

EXAMPLE 6A

The following solution was mixed before coating:

190 parts Vitel™ 3550
5.7 parts A-1310
15.2 parts CB-75
95 parts methyl ethyl ketone
95 parts toluene
1850 parts cyclohexanone
775 parts propylene glycol monomethyl ether acetate The solution was coated onto the microspheres using a 75 micrometer (3 mil) gap on a lab handspread notch bar coater. The sample was dried for 3 minutes at 150° F. (65.5° C.) and for 5 minutes at 180° F. (82.2° C.).

The sample was then coated within 24 hours with 85 nanometers of aluminum in a bell jar vacuum coater.

The following solution was then prepared.

50 parts Vitel™ 3550
25 parts toluene
25 parts methyl ethyl ketone
3 parts CB-75
1.5 parts of A-1310

This solution was coated onto the aluminum layer within 24 hours of vapor coating the aluminum. A 200 micrometer (8 mil) gap was used on a notch bar coater. This was dried for 60 seconds at 76.7° C. An 80% polyester/20% cotton woven Primalux™ fabric from Springs Industries was applied onto the coating, and this was then dried at 93.3° C. for 6 minutes.

EXAMPLE 6B (Comparative—No Intermediate Layer)

Example 6B was made according to Example 6A except no intermediate layer was placed between the aluminum layer and the layer of microspheres.

TABLE 1

$R_A$ (Cd · 1x$^{-1}$ · m$^{-2}$)

| Number Wash Cycles | Example 1 | Example 2 | Example 3 | Example 4A | Example 4B* | Example 5A | Example 5B* | Example 6A | Example 6B* |
|---|---|---|---|---|---|---|---|---|---|
| 0 | 564 | 502 | 679 | 543 | 531 | 604 | 597 | 551 | 450 |
| 1 | 540 | 395 | 366 | 404 | 307 | 542 | 572 | 491 | 133 |

TABLE 1-continued $R_A$ (Cd · lx$^{-1}$ · m$^{-2}$)

| Number Wash Cycles | Example 1 | Example 2 | Example 3 | Example 4A | Example 4B* | Example 5A | Example 5B* | Example 6A | Example 6B* |
|---|---|---|---|---|---|---|---|---|---|
| 2 | 502 | 376 | 305 | 342 | 256 | 470 | 520 | 432 | 127 |
| 3 | 464 | 343 | 267 | 309 | 224 | 460 | 476 | 376 | 117 |
| 4 | 431 | 320 | 234 | 284 | 209 | 440 | 393 | 345 | 103 |
| 5 | 404 | 302 | 203 | 262 | 196 | 411 | 365 | 308 | 100 |
| 6 | 370 | 288 | 183 | 248 | 188 | 382 | 318 | 285 | 98 |
| 7 | 343 | 271 | 161 | 232 | 170 | 355 | 258 | | |
| 8 | 322 | 263 | 136 | 212 | 154 | 337 | 212 | | |
| 9 | 305 | 255 | 114 | 203 | 141 | 314 | 181 | | |
| 10 | 291 | 244 | 90 | 184 | 128 | 305 | 153 | | |
| 11 | 278 | 236 | | 183 | 111 | 276 | 114 | | |
| 12 | | 222 | | 154 | 95 | 267 | 91 | | |
| 13 | | 218 | | 142 | 88 | 230 | 71 | | |
| 14 | | 208 | | 132 | 66 | 212 | 56 | | |
| 15 | | 206 | | 121 | 50 | 189 | 48 | | |
| 16 | | 200 | | 122 | 34 | 188 | 27 | | |
| 17 | | 196 | | 95 | 24 | 181 | 22 | | |
| 18 | | 190 | | | | 141 | 13 | | |
| 19 | | 186 | | | | 170 | 11 | | |
| 20 | | | | | | 170 | | | |

*Comparative Example

The data in Table 1 demonstrates that exposed lens retroreflective articles that possess an intermediate layer in accordance with the invention exhibit good retroreflective performance. The retroreflective sheeting's optics are not adversely compromised by the intermediate layer to an unworkable extent. The data also demonstrate that improved laundering durability is provided by the presence of the intermediate layer. Samples that possessed an intermediate layer exhibited substantially better laundering durability under industrial laundering conditions than (noted by the significantly better retention of retroreflectivity) samples that did not possess an intermediate layer.

What is claimed is:

1. An exposed lens retroreflective article that comprises:
   (a) a polymeric binder layer;
   (b) a layer of light-transmissible microspheres partially embedded in the binder layer;
   (c) a metal reflective layer disposed between the binder layer and the microsphere layer; and
   (d) a light-transmissible crosslinked polymeric intermediate layer disposed between the metal reflective layer and the microsphere layer, the intermediate layer having an average thickness of 5 nanometers to 1.5 times the average diameter of the microspheres.

2. The exposed lens retroreflective article of claim 1, wherein the intermediate layer and the metal reflective layer each are very thin relative to the thickness of the binder layer.

3. The exposed lens retroreflective article of claim 1, wherein the microspheres are made from glass or a non-vitreous ceramic composition.

4. The retroreflective article of claim 1, wherein the intermediate layer has an average thickness of 100 nanometers to one times the average diameter of the microspheres.

5. The retroreflective article of claim 1, wherein the microspheres have a refractive index of 1.6 to 2.2, and the intermediate layer has an average thickness of 100 nanometers to one times the average diameter of the microspheres.

6. The exposed lens retroreflective article of claim 1, wherein the crosslinked polymer of the intermediate layer is linked to a silane coupling agent.

7. The exposed lens retroreflective article of claim 6, wherein the polymer contains units of urethane, ester, ether, urea, epoxy, carbonate, vinyl chloride, acrylate, acrylic, olefin, amide, alkyd, or combinations thereof.

8. The exposed lens retroreflective article of claim 6, wherein the polymer is a crosslinked poly(urethane-urea) or a crosslinked poly(acrylate).

9. The exposed lens retroreflective article of claim 1 wherein the intermediate layer and the binder layer each independently comprise a crosslinked polymer, wherein the intermediate layer and the binder layer have been cured contemporaneously.

10. The exposed lens retroreflective article of claim 9, further comprising a fabric secured to the binder layer on a side opposite the metal reflective layer.

11. The exposed lens retroreflective article of claim 1, further comprising a fabric or an adhesive secured to the binder layer on a side opposite the metal reflective layer.

12. A transfer article that comprises the retroreflective article of claim 11 and a carrier web into which the layer of microspheres is partially embedded.

13. An article of clothing that comprises the retroreflective article of claim 11 and a substrate onto which the retroreflective article is secured.

14. A transfer article that comprises the retroreflective article of claim 1 and a carrier web into which the layer of microspheres is partially embedded.

15. An article of clothing that comprises the retroreflective article of claim 1 and a substrate onto which the retroreflective article is secured.

16. The article of clothing of claim 15 being a firemen's jacket or a safety vest.

17. An exposed lens retroreflective article that comprises:
   (a) a binder layer that comprises a polymer that is linked to a silane coupling agent;
   (b) a layer of light-transmissible microspheres partially embedded in the binder layer;
   (c) a metal reflective layer disposed between the binder layer and the microsphere layer; and
   (d) a light-transmissible intermediate layer disposed between the metal reflective layer and the microsphere layer, the intermediate layer comprising a crosslinked polymer that is linked to a silane coupling agent and that has an average thickness of 5 nanometers to 1.5 times the average diameter of the microspheres.

18. The exposed lens retroreflective article of claim 17, wherein the intermediate layer and the binder layer independently comprise a crosslinked poly(urethane-urea) or a crosslinked poly(acrylate), or a combination thereof, both layers having been cured essentially contemporaneously.

19. An exposed lens retroreflective article that comprises:
   (a) a polymeric binder layer;
   (b) a layer of light-transmissible microspheres that have a refractive index of 1.7 to 2.0 and an average diameter of 50 to 150 micrometers and that are partially embedded in the binder layer;
   (c) a metal reflective layer disposed between the binder layer and the microsphere layer; and
   (d) a light-transmissible polymeric intermediate layer disposed between the metal reflective layer and the microsphere layer, the intermediate layer having an average thickness of 1 micrometer to 0.25 times the average diameter of the microspheres.

20. An exposed lens retroreflective article that comprises:
   (a) a polymeric binder layer;
   (b) a layer of light-transmissible microspheres that have an average diameter of 30 to 200 micrometers and a refractive index of about 1.2 to 3.0 and that are partially embedded in the binder layer;
   (c) a metal reflective layer disposed between the binder layer and the microsphere layer; and
   (d) a light-transmissible crosslinked polymeric intermediate layer disposed between the metal reflective layer and the microsphere layer, the intermediate layer having an average thickness of 5 nanometers to 1.5 times the average diameter of the microspheres.

21. An exposed lens retroreflective article that comprises:
   (a) a polymeric binder layer that has an average thickness of 1 to 250 micrometers;
   (b) a layer of light-transmissible microspheres partially embedded in the binder layer;
   (c) a metal reflective layer 50 to 150 nanometers thick disposed between the binder layer and the microsphere layer; and
   (d) a light-transmissible crosslinked polymeric intermediate layer disposed between the metal reflective layer and the microsphere layer, the intermediate layer having an average thickness about 100 nanometers to about the average diameter of the microspheres.

22. An exposed lens retroreflective article that comprises:
   (a) a polymeric binder layer that is 50 to 150 micrometers thick;
   (b) a layer of light-transmissible microspheres partially embedded in the binder layer;
   (c) a metal reflective layer disposed between the binder layer and the microsphere layer; and
   (d) a light-transmissible crosslinked polymeric intermediate layer disposed between the metal reflective layer and the microsphere layer, the intermediate layer having an average thickness of 1 micrometer to 0.25 times the average diameter of the microspheres.

23. An exposed lens retroreflective article that comprises:
   (a) a binder layer that is 1 to 250 micrometers thick on average and that comprises a polymer that is linked to a silane coupling agent;
   (b) a layer of light-transmissible microspheres having an average diameter of 30 to 200 micrometers and being partially embedded in the binder layer;
   (c) a metal reflective layer disposed between the binder layer and the microsphere layer; and
   (d) a light-transmissible intermediate layer disposed between the metal reflective layer and the microsphere layer, the intermediate layer comprising a crosslinked polymer that is linked to a silane coupling agent and that has an average thickness of 100 nanometers to one times the average diameter of the microspheres.

24. An exposed lens retroreflective article that comprises:
   (a) a binder layer that has a thickness of 50 to 150 micrometers comprises a polymer that is linked to a silane coupling agent;
   (b) a layer of light-transmissible microspheres that have an average diameter of 50 to 150 micrometers and that are partially embedded in the binder layer;
   (c) a metal reflective layer disposed between the binder layer and the microsphere layer; and
   (d) a light-transmissible intermediate layer disposed between the metal reflective layer and the microsphere layer, the intermediate layer comprising a crosslinked polymer that is linked to a silane coupling agent and that has an average thickness of one micrometer to 0.25 times the average diameter of the microspheres.

25. An exposed lens retroreflective article that comprises:
   (a) a binder layer that comprises a polymer that is linked to a silane coupling agent;
   (b) a layer of light-transmissible microspheres that have an average diameter of 50 to 150 micrometers, that have a refractive index of 1.7 to 2.0, and that are partially embedded in the binder layer;
   (c) a metal reflective layer disposed between the binder layer and the microsphere layer; and
   (d) a light-transmissible intermediate layer disposed between the metal reflective layer and the microsphere layer, the intermediate layer comprising a crosslinked polymer that is linked to a silane coupling agent and that has an average thickness of one micrometer 0.25 times the average diameter of the microspheres.

* * * * *